United States Patent
Lapelosa (10) Patent No.: US 9,986,861 B2
(45) Date of Patent: Jun. 5, 2018

(54) GLASS HOLDER FOR INDIVIDUAL GLASSES DURING THEIR USE

(71) Applicant: ASSEMBLING S.R.L., Spilamberto (IT)

(72) Inventor: Marco Lapelosa, Modena (IT)

(73) Assignee: ASSEMBLING S.R.L., Spilamberto (IT)

( * ) Notice: Subject to any disclaimer, the term of this patent is extended or adjusted under 35 U.S.C. 154(b) by 0 days. days.

(21) Appl. No.: 15/305,236

(22) PCT Filed: Apr. 20, 2015

(86) PCT No.: PCT/IB2015/000525
§ 371 (c)(1),
(2) Date: Oct. 19, 2016

(87) PCT Pub. No.: WO2015/159148
PCT Pub. Date: Oct. 22, 2015

(65) Prior Publication Data
US 2017/0143144 A1    May 25, 2017

(30) Foreign Application Priority Data
Apr. 18, 2014  (IT) .............................. MO2014A0108

(51) Int. Cl.
*A47G 23/02*    (2006.01)
*A47F 5/00*     (2006.01)
(Continued)

(52) U.S. Cl.
CPC ........ *A47G 23/0225* (2013.01); *A47F 5/0846* (2013.01); *A47J 45/02* (2013.01); *A47J 47/16* (2013.01); *B60N 3/102* (2013.01)

(58) Field of Classification Search
CPC ... A47G 23/0225; A47F 5/0846; B60N 3/102; A47J 45/02; A47J 47/16
(Continued)

(56) References Cited

U.S. PATENT DOCUMENTS 1,378,403 A  * 5/1921 Dunn ..................... A47G 29/18
                                                  232/42
2,041,755 A    5/1936 Gordon
(Continued)

FOREIGN PATENT DOCUMENTS

GB          2 029 197 A    3/1980

OTHER PUBLICATIONS

International Search Report in PCT/IB2015/000525 dated Aug. 14, 2015.

*Primary Examiner* — Tan Le
(74) *Attorney, Agent, or Firm* — McGinn IP Law Group, PLLC (57) ABSTRACT

A cup holder for single cups, includes housing means of the cup in the cup holder with grip on the edge or in proximity to the upper edge of the cup and supporting means of the cup holder for supporting the so housed cup; a plane or upper surface of covering of the cup, when it is housed in the cup holder with such an extension as to cover entirely the cup and rigidly connected to the housing means of the cup. The cup holder has the supporting means placed on the side opposite the side of introduction of the cup in the housing means; the housing means includes a housing guide for the grip on an upper edge of a cup which is inserted in it; and the supporting means includes a short shank and a slider inserted in rectilinear or arched storage elements, arranged in a horizontal or even vertical direction.

17 Claims, 10 Drawing Sheets

(51) Int. Cl.
*A47K 1/08* (2006.01)
*A47J 47/16* (2006.01)
*A47J 45/02* (2006.01)
*A47F 5/08* (2006.01)
*B60N 3/10* (2006.01)

(58) Field of Classification Search
USPC .......... 248/312, 309.4, 312.1, 311.2; 211/75, 211/76, 85.29, 71.01
See application file for complete search history.

(56) References Cited

U.S. PATENT DOCUMENTS

| | | | | |
|---|---|---|---|---|
| 2,557,801 A * | 6/1951 | Shapiro | .................... | A47J 47/16 108/26 |
| 2,633,323 A * | 3/1953 | Burger | .................... | A47J 45/02 248/312 |
| 3,365,068 A * | 1/1968 | Crosby | .................... | A47J 47/16 211/74 |
| 3,986,695 A * | 10/1976 | Hronas | .................... | A47F 7/285 211/74 |
| 4,215,840 A * | 8/1980 | Babberl | ................ | A47F 5/0068 248/214 |
| 6,520,350 B1 * | 2/2003 | Smith | ...................... | B25H 3/04 211/74 |
| 7,207,448 B1 * | 4/2007 | Marino, Jr. | ............ | B25H 3/023 211/85.29 |
| 7,762,515 B2 * | 7/2010 | Lin | ...................... | F16M 11/046 248/133 |
| 2007/0176069 A1 | 8/2007 | Mitchell | | |
| 2007/0264167 A1 | 11/2007 | Warner | | |
| 2017/0143144 A1 * | 5/2017 | Lapelosa | ............ | A47G 23/0225 |

* cited by examiner

GLASS HOLDER FOR INDIVIDUAL GLASSES DURING THEIR USE

FIELD OF THE INVENTION

The present invention relates to a cup holder for single cups, namely an apparatus for storing the cups singularly during their use even if they are disposable, keeping the single cup recognizable.

PRIOR ART

The prior art comprises closed or open ring single cup holders where the user places the cup and takes it again to consume the drink contained in the cup. Moreover, said devices are made for one single use in vehicles, due to their folding, without the cup, and the transport and a mobile use, that is to say, in one's hand either with the user or in the vehicle on which they are mounted.

These cup holders are made with a structure that allows to position said ring with the extraction or folding from the rest position. They have no cup cover but only a seat, as said, in the form of a closed or open ring for supporting in the desired point the cup with the drink for the user also, in case, in a hanging condition.

In the prior art, it is also known to use disposable cups in workplaces or frequented places, either public or private. During use, users, especially in the hot months and during work, are inclined to consume many drinks, both ready-to-drink and also simple water from the available water dispensers. Therefore, being focused on what one is doing, the user often tends to forget his/her cup in different points of his/her working space, but the user also tends to put down the cup in positions which are not very stable or safe for the preservation of the content, mainly due to lack of attention; moreover, said free use does not prevent its contamination with the dust of the working environment and the involuntary exchange of one's cup with that of the colleagues.

In fact, the main limit is that, although a support for housing a single cup is known, the use left to the freedom of the user leads to obtain a new cup for each use of the cups from the water dispensers or from the drink dispensers, with the consequence that each user uses many cups during the working period, with an increase in costs and in the production of waste from the disposable cups which are normally used.

Moreover, to protect a full or not completely empty cup holed covers were made, for a straw, or non-holed covers, to be removed and applied every time one pours the drink, so that it is necessary to use the cup with two hands to open and close the cup; finally, cups housed under a plastic plate are known, which allow the user to handle the plate and the cup with one hand only.

Moreover, as stated above, in the workplaces even several people can use the same type of cup, as it is dispensed by the same apparatus for water or for hot and cold drinks, therefore, in the presence of several people who operate in the same area, it often happens that they confuse the cups, as they are concentrated on the job they are doing, with the consequent exchange among people with the risk of transmission of bacteria and germs in an unaware way, which can be a source of contagion among the users.

The prior art document US 2007/0264167 A1 is known, which discloses a support for cups of the disposable type in which the cup, when housed in the support, is covered by an overlying plane. The cup for its introduction is lightly pressed thanks to its natural elasticity and is supported on wings or bearings made in the lower part of the overlying covering plane. Forms of multiple support on a horizontal line, also superimposed, or in a circular structure, are also described. Moreover, such a support does not enable the movement of the cup with its content without extracting it from the support and also without preventing a possible contamination with the atmosphere or the accidental exchange with other users.

Finally, especially in the use with water dispensers, the user is led to use the same cup several times, for the successive pourings of water from the dispenser and, therefore, between a pouring, the drinking and the following pouring the cup must be protected from the exchange with the colleagues, as said, but also from the possible contamination in the workplace. The use with simple water does not require an immediate washing of the cup if the cup is a normal cup and not a disposable paper or plastic cup. In this way, that is to say, by limiting the number of cups that must be used for each user, one reduces the cost for the service of dispensing of water and of other drinks, and also the cost for waste disposal: the user can choose to use a new cup or the cup to be disposable.

This prior art is susceptible of significant improvements as to the possibility to realize a cup holder for single cups, which overcomes the above-mentioned limits of the prior art, realizing a new way of using and managing disposable cups.

Therefore, the technical problem, which is at the basis of the present invention is to realize a cup holder for single cups, which enables, in addition to the fast and practical housing of the cup, to recognize the cup itself and to protect it in the periods of storage and preservation of the cup with the drink or also without drink with the possibility to move the cup holder to a different point of use of the latter.

An aim included in the previous technical problem is to make a cup holder practical and adaptable for several uses as specified above, both in a single arrangement and associated with other similar cup holders, enabling its positioning on different kinds of supporting elements with the most complete freedom of positioning and single locking of the cup in the cup holder.

A further part of the technical problem and of completion of what is explained above is to make easy the shift from one position to another, for example to another workplace, of the same cup holder with or without the cup with the drink housed in it.

Finally, an additional and further aim of the present invention is to enable to use, to the user's liking, the single cup holder in exact positions of the workplace, which can be different from each other and which comprise, not in an exclusive way, supporting metal elements.

SUMMARY OF THE INVENTION

This problem is solved, according to the present invention, by a cup holder for single cups, comprising housing means of the cup in the cup holder with grip on the edge or in proximity to the upper edge of the cup and supporting means of the cup holder for supporting the so housed cup; an upper covering plane or surface of the cup, when it is housed in the cup holder with such an extension as to entirely cover the cup and rigidly connected to the housing means of the cup; characterised in that the cup holder has the supporting means placed on the side opposite to the side of introduction of the cup in the housing means; the housing means comprise a housing guide for the grip on an upper edge of a cup that is inserted into it; moreover, the supporting means comprise a short shank and a slider inserted in rectilinear or arched storage elements, arranged in a horizontal or even vertical direction.

In an additional embodiment the supporting means comprise a magnet inserted in said slider for a magnetic fixing of the cup holder to a ferromagnetic surface.

Furthermore, in a specific embodiment the cup holder is made in two parts; a first upper part comprises a covering plane of the cup, an upper rib, as well as the slider and its short shank of connection; and a second lower part that comprises the housing guide of the upper edge of the cup, when housed in it; the two parts at assembly are rigidly connected.

Moreover, in an additional embodiment, the rigid connection between the two parts is made by means of sliding means lockable by external action or internal shape.

Furthermore, in a specific improved embodiment the sliding and locking means comprise male guides, blind grooves and end projections.

Moreover, in an additional embodiment the upper covering plane or surface has locking means of the extraction of the inserted cup, comprising elements for closing the housing means of the cup.

Furthermore, in a specific embodiment said closing means comprise a case, provided with an arched lower edge to complete the housing guide of the cup, when inserted in the cup holder.

Moreover, in a preferred embodiment, more than one cup holder are accommodated in rectilinear or arched storage elements, arranged in a horizontal or even vertical direction with the insertion of the slider within the folded edges of the sections constituting said storage elements; and wherein the storage elements are made with "C"-shaped or "U"-shaped sections, for the insertion and grip of the supporting means of each cup holder.

Moreover, in an additional embodiment, the storage elements have housing or preferred insertion seats of the slider of each cup holder.

Furthermore, in a specific embodiment, the housing seats comprise a notch present on one side of a "U"-shaped section.

Moreover, in an additional and specific embodiment, in "C"-shaped sections with folded edges there are insertion points of a respective slider comprising an indentation dimensioned to house the slider in the insertion/extraction; the cup holder after insertion is moved to a position of convenient use in the section itself.

Furthermore, in a specific embodiment, the dimension of the indentation in a direction parallel to the section is slightly greater than the corresponding dimension of the slider or even than the dimension measured parallel to the plane of the cup holder, of a horizontally dimensioned slider or the dimension measured perpendicularly to the plane of the cup holder of a vertically dimensioned slider.

Moreover, in an additional embodiment, a slider has the dimension measured perpendicularly to the plane of the cup holder, of a horizontally dimensioned slider, or to the dimension measured parallel to the plane of the cup holder of a vertically dimensioned slider and which is smaller than the distance between the folded edges of a section with vertical or horizontal arrangement; and furthermore the internal height of said section is greater than the dimension of the slider, measured perpendicularly to the plane of the cup holder, of a horizontally dimensioned slider, or than the dimension measured parallel to the plane of the cup holder of a vertically dimensioned slider.

Finally, in an improved embodiment the slider has bevels or radius between its side faces to facilitate a rotation with respect to an internal height of the section after the insertion into a section with folded edges.

Further features and the advantages of the present invention, in the realization of a cup holder for single cups, will be evident from the description, made in the following, of embodiments given as an illustrative and non-exhaustive example with reference to the ten drawing tables here enclosed.

DETAILED DESCRIPTION OF PREFERRED EMBODIMENTS

In FIGS. 1 to 5 and 10, 11 one can see a cup holder 1, made according to the invention, in which a cup 2, of the disposable type, is held to the cup holder by means of a grip on the upper edge 3 of the cup 2 itself. The grip consists of a housing guide 4 made as a grooved appendix 5 below a plane 6, which, with the cup 2 housed, protects the internal part of the cup and its drink or simple water content from the environment in which the cup holder 1 is situated. The plane 6 has a thickness sufficient to support the cup 2, even if completely full of drink housed in the grooved appendix 5. The grooved appendix has an open shape, that is to say, it is not closed in a ring, with such an amplitude as to be just greater than the diameter of the upper mouth of the cup 2 in such a way as to receive the edge 3 of the cup 2, when this is pushed into the housing guide 4. The edge 3 upon introduction suffers a small compression, at the mouth of introduction into the housing guide 4, however such as not to damage the cup 2 and also enable an insertion and extraction repeated several times without damaging the cup itself.

The cup holder 1 is provided, at the opposite end of the plane 6 with respect to the position of introduction of the guide 4, with an upper rib 7 above the plane and an additional lower rib 8 below the plane; the latter is connected to the grooved appendix 5, while the upper rib 7 is an extension above the plane 6 of said lower rib 8. In the upper rib 7 there is a recess 9 where one can put a mark or label or a name, in such a way as to highlight the reference to the cup of a specific user of said cup holder so identified. At the back of the cup holder 1, joined by a short shank 10, there is a slider 11 provided on the back face 12 with a magnet 13 to enable the grip on a ferromagnetic metal surface to which it is opposed. Finally, in the end opposite to the ribs 7 and 8 of the plane 6 there is a hole 14 for enabling the locking of the extraction of a cup or even to prevent the introduction of a cup, by means of the introduction of a small padlock, stop or the like in said hole. Any tampering leads to the damage of the disposable cup.

FIGS. 6 to 9 show the cup holder 1 in which a case 15 is used comprising an upper plane 16 and an arched lower edge 17 as the housing guide 4, moreover the case is provided with a hole 18 which, when housed in the locking position of a cup 2 within the housing guide 4, corresponds to the hole 14 present in the plane 6 of the cup holder.

FIGS. 12 to 19 show an improved embodiment of a cup holder, according to the invention, subdivided into two parts in which a first upper part 19 includes the covering plane 20 of the cup, the upper rib 21, comprising the recess 9, as well as the slider 22 and the short shank of connection of the latter; a second lower part 23 is associated to the first upper part 19 at the bottom in the assembly and includes the housing guide 24 of the upper edge 3 of the cup 2 when housed in it, the lower rib 25 and a reduced lower part 26 of tang for holding in position said second lower part after assembly and prevent its extraction during use with the cup holder complete with the cup. In the plane 20 there are male guides 27 prominent downwards and in the upper face 28 of the housing guide 24 there are blind grooves 29 for receiving said male guides in the assembly for sliding parallel to said plane 20; the male guides 27 are provided with end projections 30 for realizing their retaining within said blind grooves in the desired position after insertion. In FIGS. 20 to 25 one can see in a perspective view the relative positions of the two upper 19 and lower parts 23 of the cup holder in the insertion.

Figure 1:
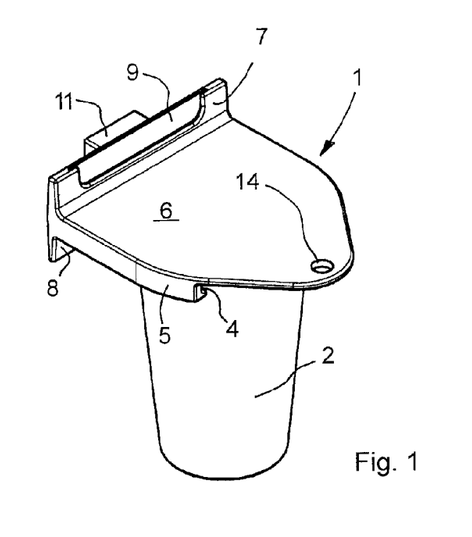
FIG. 1 shows a schematic perspective view of a cup holder according to the invention with a usual paper or plastic cup of the disposable type housed in it.
Figure 2:
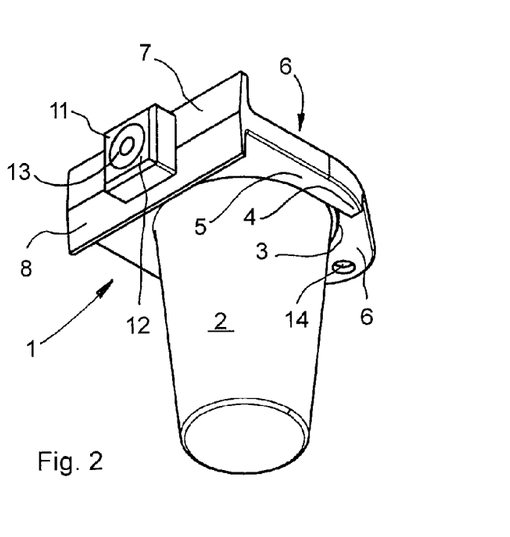
FIG. 2 shows a schematic perspective view, similar to FIG. 1, but from a different angle to show the back and lower part of the cup holder.
Figure 3:
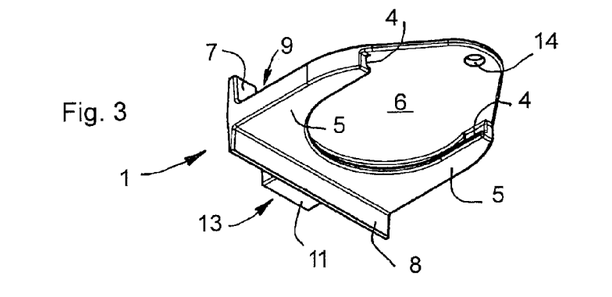
FIG. 3 shows a schematic perspective view of a cup holder as seen from its lower part.
Figure 4:
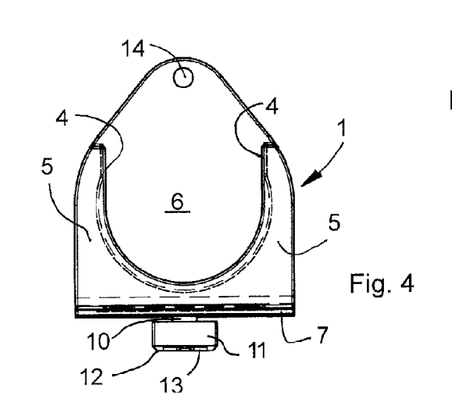
FIG. 4 shows a schematic plan view from the lower part of the cup holder.
Figure 5:
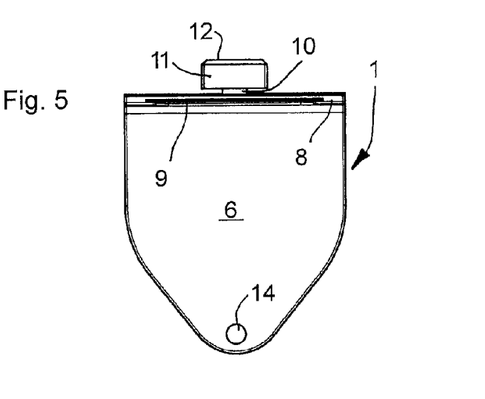
FIG. 5 shows a schematic plan view from the upper part of the cup holder.
Figures 6, 7:
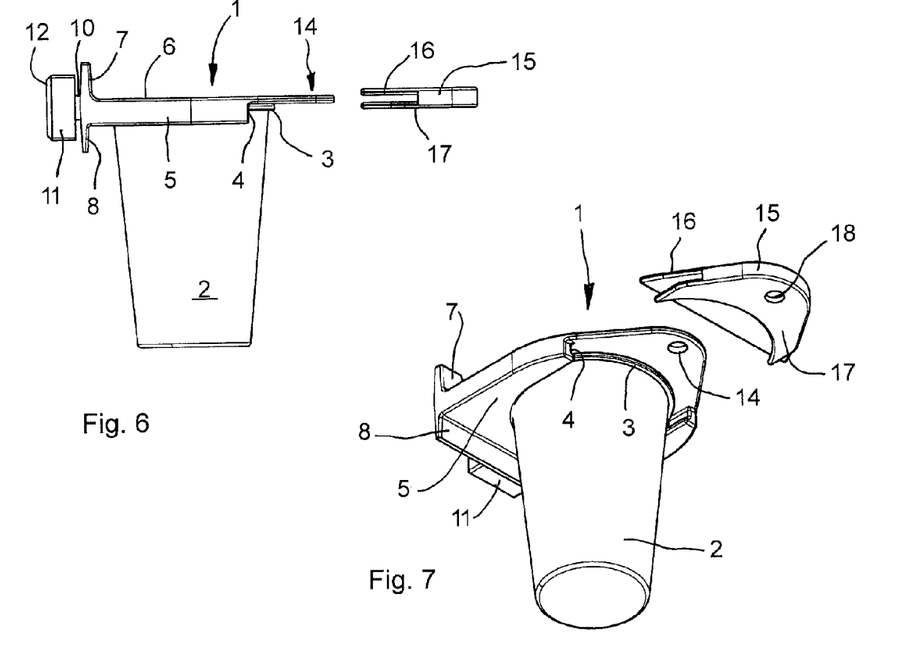
FIG. 6 shows a schematic side view of the cup holder of FIG. 1 provided with a case for closing the housing guide and locking the cup in the seat.
FIG. 7 shows a schematic lower perspective view of the cup holder of FIG. 6 with the case for locking the cup within the cup holder.
Figure 8:
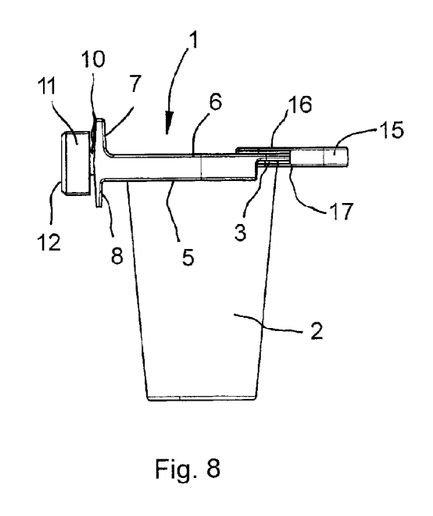
FIG. 8 shows a schematic side view of the cup holder of FIG. 6 in a position of closing and locking of the cup in the seat.
Figure 9:
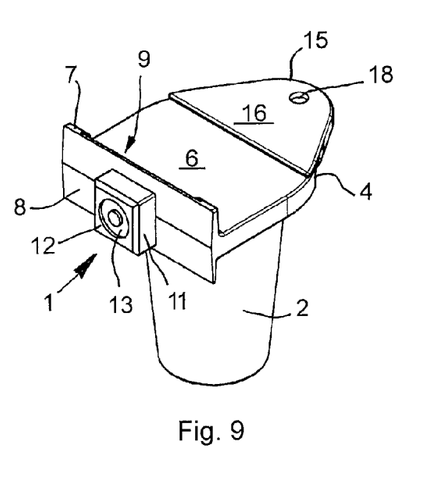
FIG. 9 shows a schematic upper perspective view of the cup holder of FIG. 8.
Figure 10:
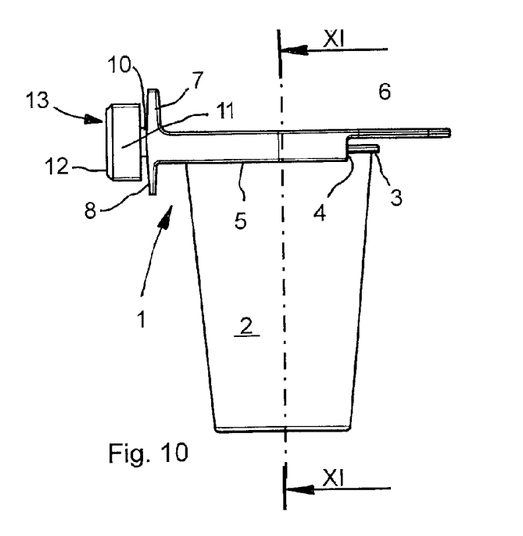
FIG. 10 shows a schematic side view of the cup holder of the previous Figures.
Figure 11:
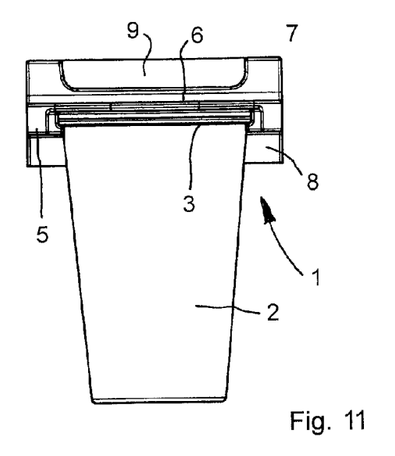
FIG. 11 shows a schematic section XI-XI of FIG. 10.
Figures 12, 13:
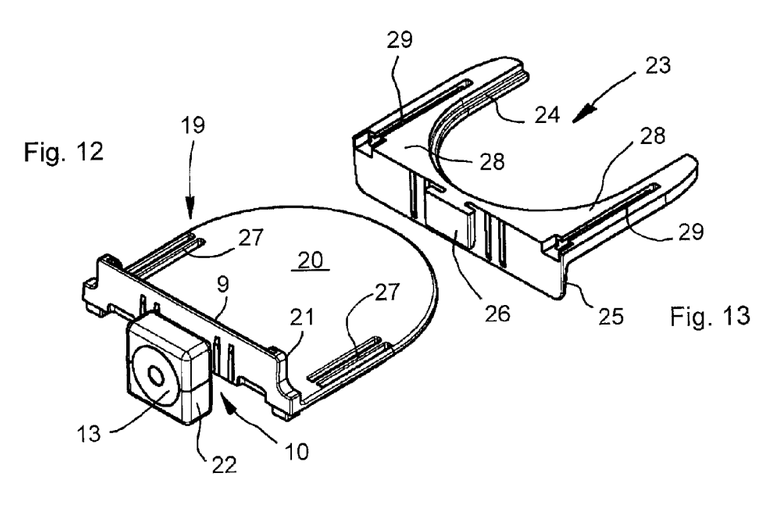
FIG. 12 shows a schematic perspective view of a cover for a cup holder, according to the invention, made detached from the cup support.
FIG. 13 shows a schematic perspective view of the cup support, made separate from the cover of the cup holder of FIG. 12, ready to be inserted into the cover to constitute a complete cup holder similar to those of the previous Figures.
Figure 14:
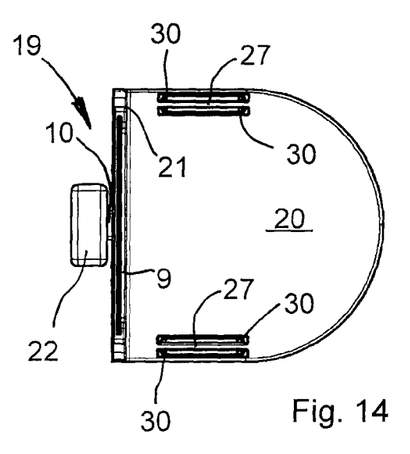
FIG. 14 shows a schematic view from the top of the cover for cup holder of FIG. 12.
Figure 15:
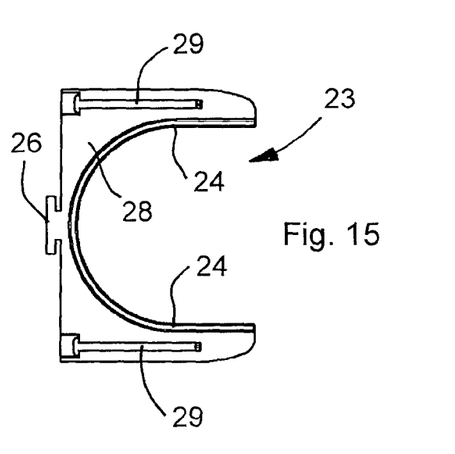
FIG. 15 shows a schematic view from the top of the cup support of FIG. 13.
Figure 16:
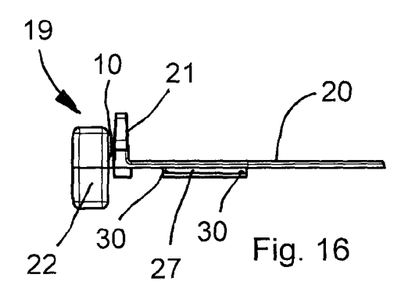
FIG. 16 shows a schematic side view of the cover for cup holder of FIG. 12.
Figure 17:
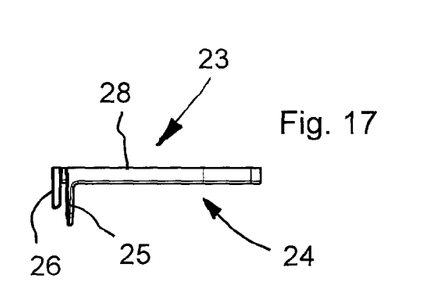
FIG. 17 shows a schematic side view of the cup support of FIG. 13.
Figure 18:
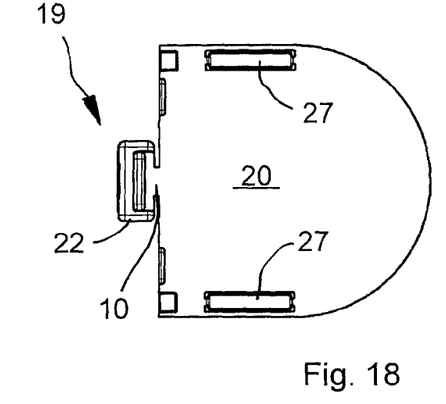
FIG. 18 shows a schematic lower view of the cover for cup holder of FIG. 12.
Figure 19:
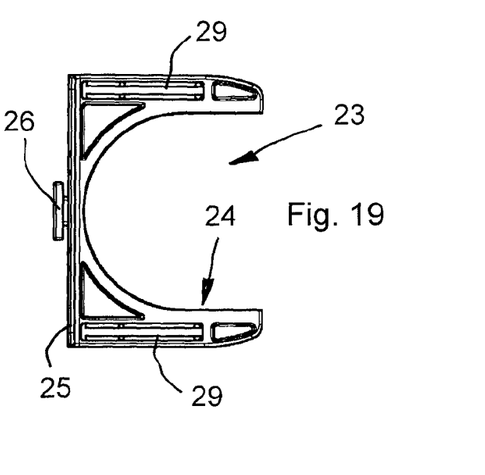
FIG. 19 shows a schematic lower view of the cup support of FIG. 13.
Figure 20:
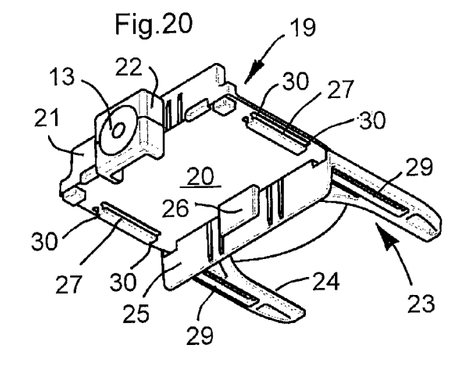
FIG. 20 shows a schematic lower perspective view of the first phase of insertion of the cup support of FIG. 13 into the cover of the cup holder of FIG. 12.
Figure 21:
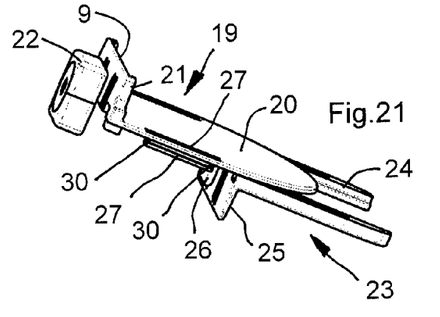
FIG. 21 shows a schematic side perspective view of the first phase of insertion of FIG. 20.
Figure 22:
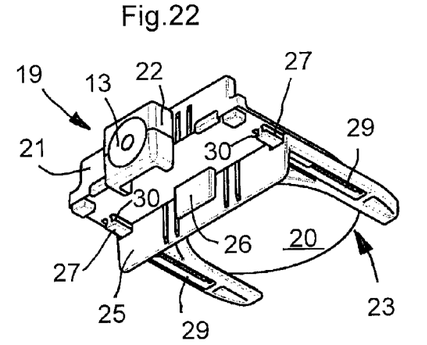
FIG. 22 shows a schematic lower perspective view of the second phase of insertion following the phase of FIG. 20.
Figure 23:
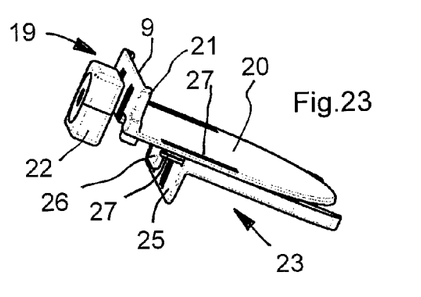
FIG. 23 shows a schematic side perspective view of the second phase of insertion of FIG. 22.
Figure 24:
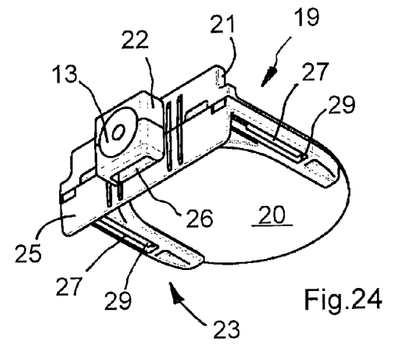
FIG. 24 shows a schematic lower perspective view of the final appearance of the cup holder completely mounted with the cover of FIG. 12 and the support of FIG. 13.
Figure 25:
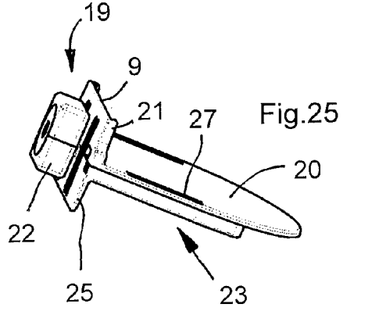
FIG. 25 shows a schematic side perspective view of the cup holder mounted after complete insertion as in FIG. 24.
Figures 26, 27, 28:
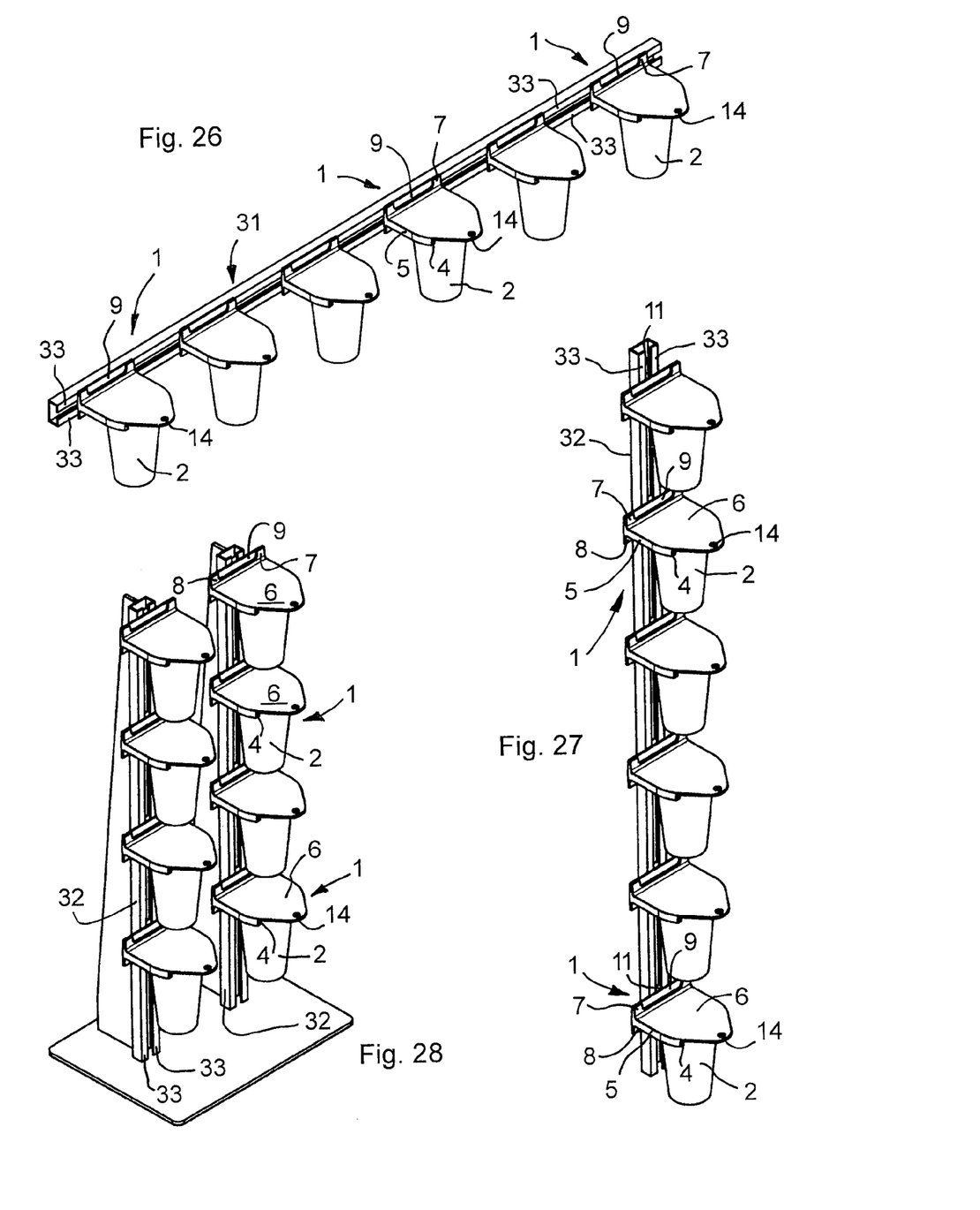
FIG. 26 shows a schematic perspective view of a horizontal storage element of a plurality of cup holders with a respective cup housed in them.
FIG. 27 shows a schematic perspective view of a storage element with vertical arrangement of a plurality of cup holders with a respective cup housed in them.
FIG. 28 shows a schematic perspective view of a storage element with vertical arrangement with two vertical supports with a plurality of cup holders with a respective cup housed in them.

In FIGS. 26, 27 and 28 a plurality of cup holders 1 is mounted on a storage element having a "C"-shaped section 31 with horizontal arrangement, or with a "C"-shaped section 32 with vertical arrangement or with a double arrangement in vertical of the section; each cup holder 1 is supported by means of the short shank 10 and the corresponding slider 11 or 22 when this is introduced into the folded edges 33 of the "C"-shaped section. Of the six cup holders 1 shown the most internal ones are introduced first from the end of the section until the planned position, then the intermediate cup holders are introduced and then the end cup holders. The fixing of the cup holders within the "C"-shaped section occurs by interference of the folded edges 33 within the space between the slider 11, 22 and the back face of the ribs; so only in the case in which the section 15 is of ferromagnetic material the grip and the fixing in the section can also occur only by magnetic grip of the magnet 13 against the internal wall of the "C"-shaped section opposite said folded edges 33.

In FIGS. 27 and 28 the "C"-shaped section has a vertical arrangement, however, the grip of the slider, for the friction on the folded edges 33 of the "C"-shaped section or for magnetic connection, must be stronger to prevent the vertical descent along the section itself.

The plurality of cup holders 1, shown in the previous Figures, is generally applied to walls, that is to say, to vertical walls of environments, of partitions of environments or even of furniture or equipment with a surface intended for the application of the described "C"-shaped section in such a way as to be as much as possible within the reach of and usable by the people for whom said cup holders are intended.

Figures 29, 30:
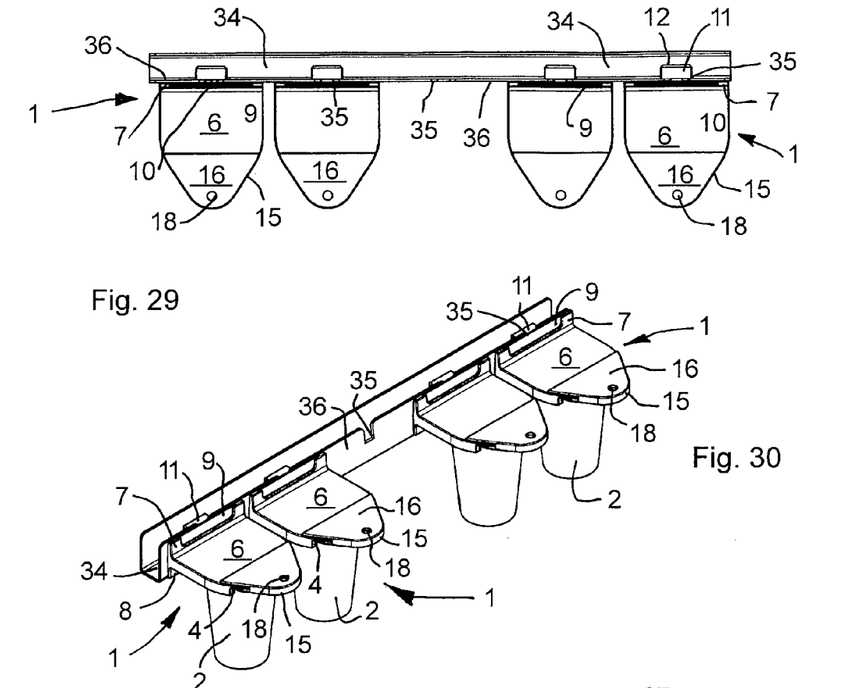
FIG. 29 shows a schematic plan view of a storage element of cup holders with insertion seats from the top of a respective cup holder put close to each other with horizontal development.
FIG. 30 shows a schematic perspective view of a storage element of cup holders of FIG. 29.
Figure 31:
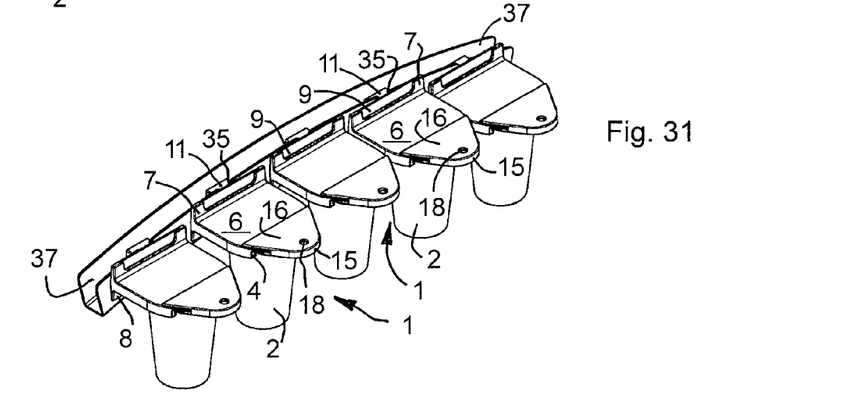
FIG. 31 shows a schematic perspective view from the top of a storage element of cup holders with insertion seats from the top, of a respective cup holder put close to each other, with an arched development of the storage element.
Figure 32:
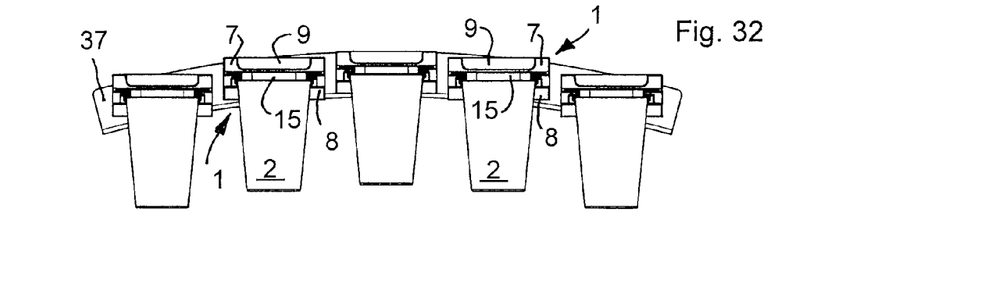
FIG. 32 shows a schematic front view of a storage element of cup holders of FIG. 31.
Figure 33:
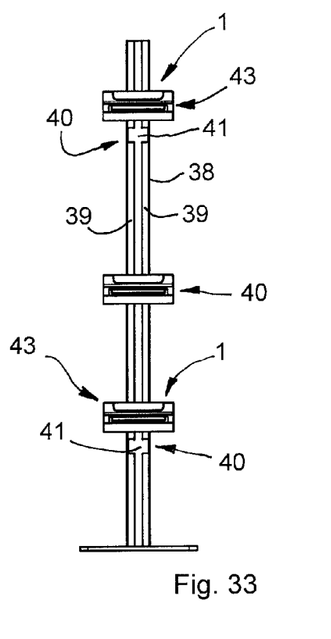
FIG. 33 shows a schematic front view of a storage element of cup holders placed in vertical wherein in the section some insertion points of the slider of a cup holder are made.
Figure 34:
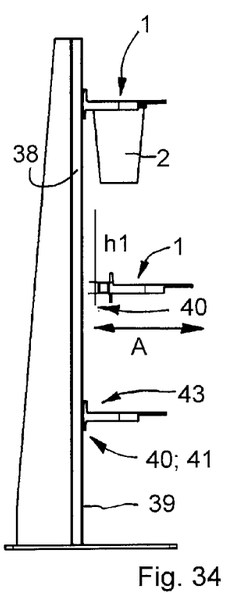
FIG. 34 shows a schematic side view of a storage element of cup holders of FIG. 33 wherein one can see the upper cup holder with its cup, the lower cup holder housed in the vertical section and an intermediate cup holder at the moment of insertion of its slider between folded edges of the section.
Figure 35:
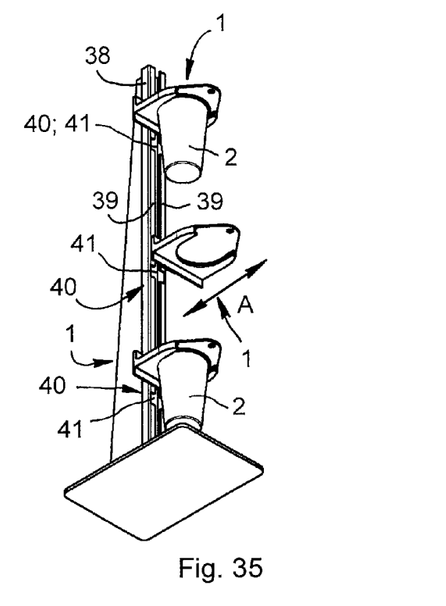
FIG. 35 shows a schematic perspective view of the storage element of cup holders of FIG. 34 wherein one can also see the insertion point between the folded edges and the intermediate cup holder aligned to it for insertion.
Figure 36:
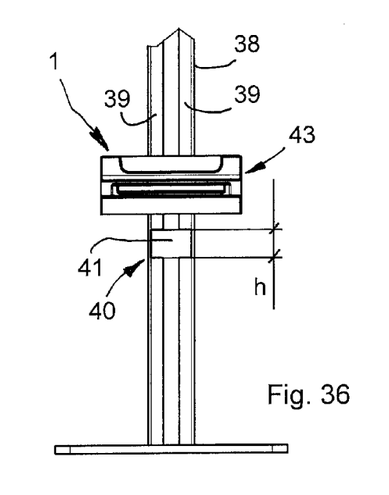
FIG. 36 shows a schematic enlarged partial front view of the lower cup holder and of the insertion point of FIG. 33.
Figure 37:
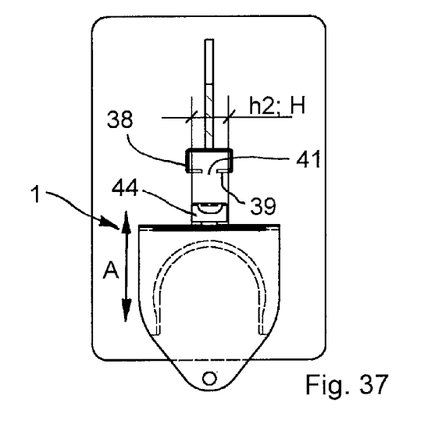
FIG. 37 shows a schematic plan section of the storage element of FIG. 34 with the slider of the cup holder in insertion between the folded edges of the section.
Figure 38:
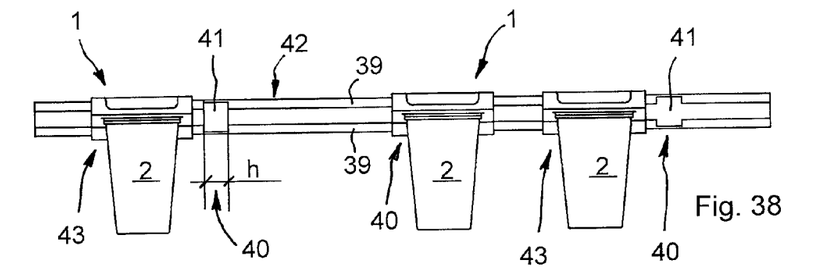
FIG. 38 shows a schematic front view of a horizontal cup holder storage element in which in the section some insertion points of the slider of a cup holder are made, similarly to the section of FIG. 33 and following Figures.
Figure 39:
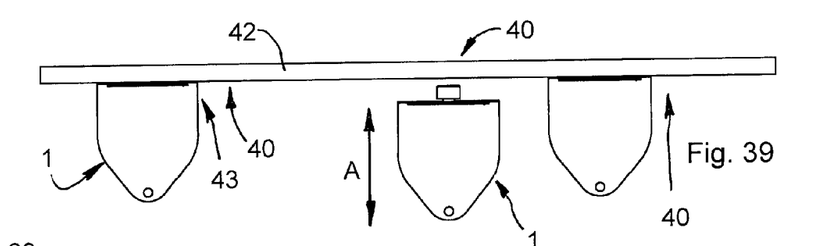
FIG. 39 shows a schematic plan view of a storage element of cup holders of FIG. 38 in which one can see the intermediate cup holder at the moment of insertion of the slider between folded edges of the section.
Figure 40:
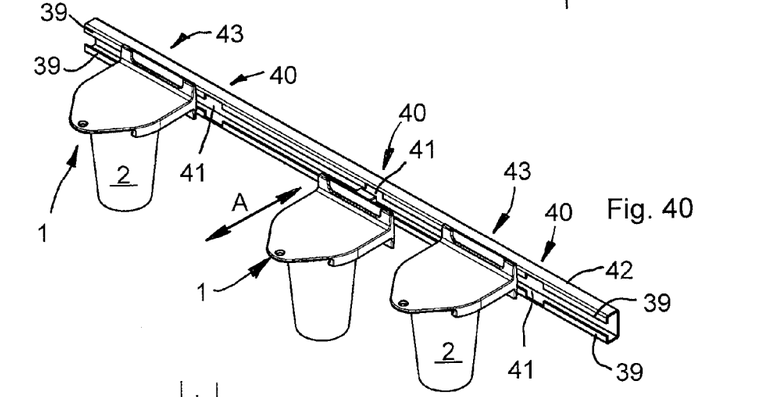
FIG. 40 shows a schematic perspective view from the top of the horizontal storage element of cup holders of FIGS. 38 and 39, with the intermediate cup holder at the moment of insertion in the proper point.

In FIGS. 29 and 30 a series of cup holders 1 are housed in a storage element with a "U"-shaped section 34 having a rectilinear shape, placed horizontally and provided with notches 35 on one of the edges 36, where the respective short shanks 10 are housed to lock with a light friction the corresponding slider 11, 22 and allow to keep the cup holder 1 in position. Similarly, in FIGS. 31 and 32 one can see a further series of cup holders 1 housed on a storage element having a "U"-shaped section 37 with arched development, provided like the storage element 34 with notches 35 on at least one of the edges 36, to house several cup holders. The storage elements 34 and 37 being able to be applied to a vertical surface in any way possible by fixing the free edge of the "U"-shaped section or by support of the portion of connection of the edges of the "U".

FIGS. 33 to 40 show a storage element having a vertical "C"-shaped section 38, according to an additional embodiment of the invention, wherein between the folded edges 39 there are insertion points 40 in which an indentation 41 is arranged to allow the insertion of a slider 11 or 22 of a cup holder of the type described above. The slider of the cup holder is inserted/extracted with motion A, of FIG. 34 and following Figures, in the indentation 41 of the vertical section 38; likewise also a horizontal "C"-shaped section 42 can be made with said insertion points 40 and indentations 41. After the insertion the cup holder is made to slide inside the section in such a way as to reach the horizontal or vertical position of convenient use 43 for the user. To enable insertion the internal part of said sections must have an internal width H a little greater than the height h2, parallel to the direction of the sides of the indentation 41, of the horizontally dimensioned slider 44, mounted on vertical section, or height h4 of the vertically dimensioned slider 46 mounted on horizontal section; moreover, the distance between the sides h of the indentation must be a little greater than the height h1/h3 of the dimensioned slider 44 or 46 on the basis of the orientation of the section or the corresponding height, not shown in the Figures, of the previously described sliders 11 or 22. Said dimensions are visible in FIGS. 41 and 42, which show the insertion in the indentation 41 of a horizontally dimensioned slider and the structure of the slider.

Figure 41:
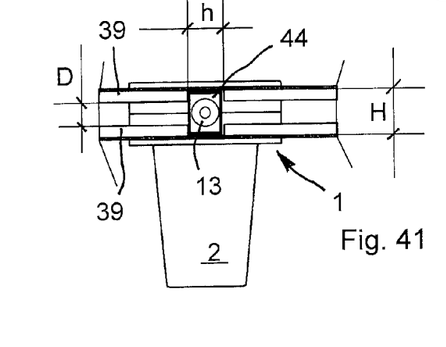
FIG. 41 shows a schematic section longitudinal to the horizontal section of the storage element of cup holders with the insertion point of the slider visible.
Figure 42:
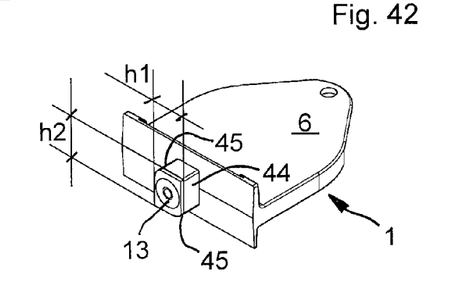
FIG. 42 shows a schematic perspective view of the cup holder with a slider having a rectangular shape for the introduction in the insertion point of the previous Figures.

Moreover, if the distance D between the folded edges 33 is smaller than the horizontal height h2 the slider 44 can be inserted, with a preliminary right angle rotation R, within the edges of a horizontal section 31 also without insertion points 40. In order to easily realize the insertion A in this case, a dimensioned slider 44 can have bevels or radius 45 to realize the rotation inside the walls of the section and bring the cup holder back to the correct support position.

Figures 43, 44, 45, 46, 47:
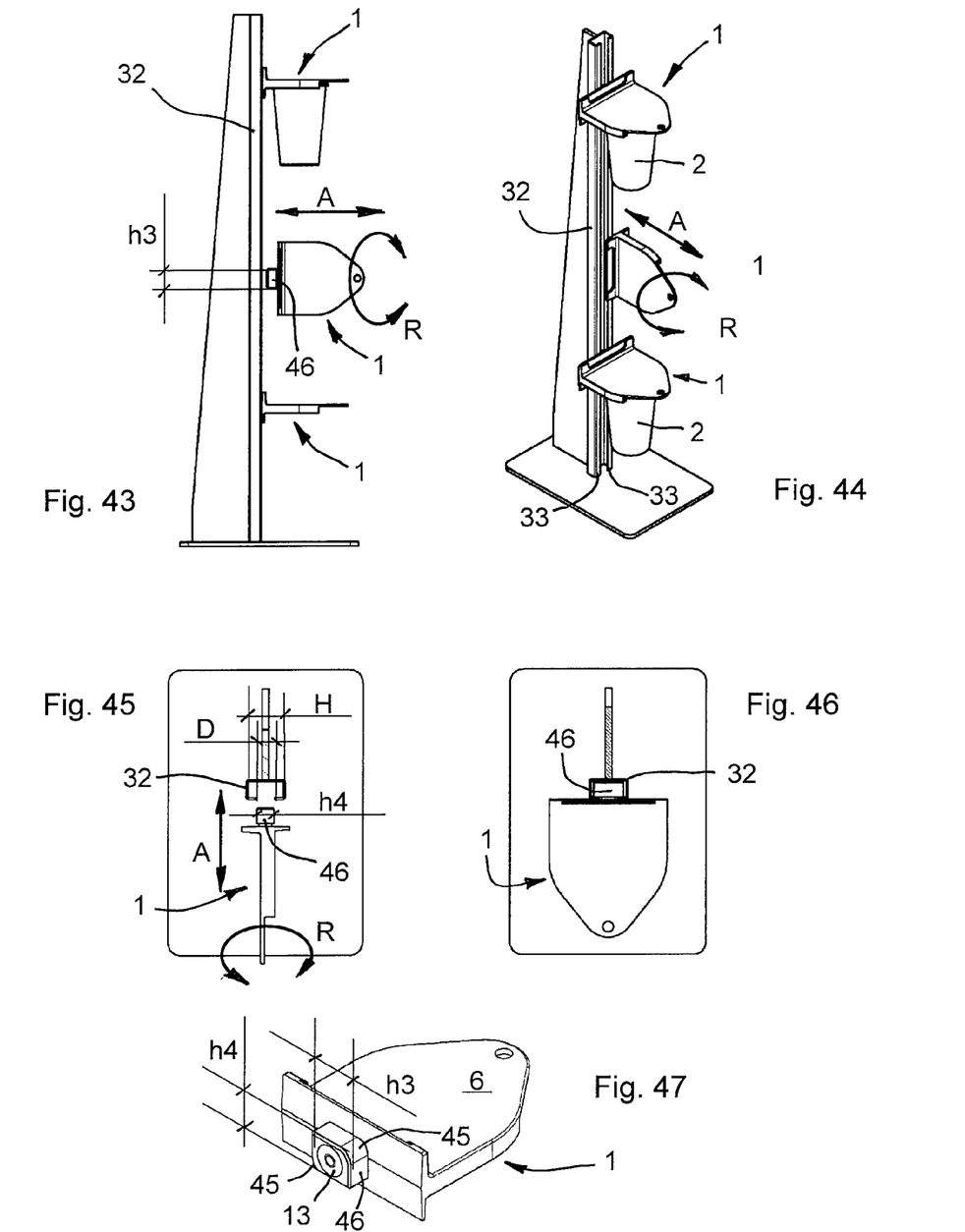
FIG. 43 shows a schematic side view of a storage element with vertical section of cup holders in which the cup holder has a slider having a rectangular shape and intended to be inserted into the folded edges of the section with a right-angled position with respect to the position of housing and final support of the cup as expected by the user.
FIG. 44 shows a schematic perspective view of the storage element of cup holders in which one can see, similarly to FIG. 43, the intermediate cup holder in the rotated position of introduction of the slider into the edges of the section.
FIG. 45 shows a schematic plan section of the storage element with vertical section of the cup holder rotated and provided with the slider having a rectangular shape in the phase of insertion between the edges of the vertical section.
FIG. 46 shows a schematic plan section like FIG. 45 with the cup holder completely inserted and rotated.
FIG. 47 shows a schematic perspective view of the cup holder with a slider having a rectangular shape for the introduction between the edges of the vertical storage element section of the previous Figures; moreover the slider in this Figure is similar to the slider of FIG. 42 but rotated by a right angle with respect to the cup holder; this enables to use the sliders of the cup holder of FIG. 42 for a rotational insertion of the cup holder between the edges of horizontal storage element sections similarly to what is depicted for the vertical storage element sections.

To complete the embodiment the cup holder can be made with a vertically dimensioned slider 46, as one can see in FIGS. 43 to 46 and for the dimensioning in FIG. 47. In it the vertically dimensioned slider 46 has a height h3 a little smaller than an internal height H of the previously described vertical section 32 and a height h4 a little smaller than the distance D between the folded edges 33 of the vertical section. The insertion of this dimensioned slider 46 occurs as described, with the insertion motion A; for the dimensioned slider 44 the insertion/extraction occurs similarly, if necessary in the presence of bevels or radius 45, with the insertion/extraction A and the rotation R inside the walls of the section and to bring the cup holder back in the correct support position.

The use of the cup holder 1 occurs as specified in the following. The user when using the cup 2, after the pouring and the partial use of the drink or water, instead of leaving the cup in any point of the workplace, desk or bench for manual works and/or machine for mechanical works, inserts the edge 3, of the paper or plastic cup 2 of the disposable type, into the housing guide 4 with a light compression of the edge 3. Thus, the cup remains housed in it and is ready to be seized at any time by the user for a new use, both to consume its content, and to pour additional drink or water for a new use. In this way the user can protect his/her cup from the working environment if this is polluted or even prevent the cup from being dangerous for work documents, such as papers on a desk that may be damaged by liquid spilled on them. The possibility of inserting a stop also with key such as a padlock in the hole 14 or also in the hole 18 of the case 15 allows the user to control his/her cup also in case of absence from the workplace both due to absence from work or even due to the temporary displacement of the working point, thus preventing involuntary tampering by other users.

The cup holder 1 can always be identified by the user, even if it is inserted in storage elements of cup holders, because it can be made in different colours or even identified or named by affixing identifying names or signs in the recess 9. Moreover, each cup holder 1 can be used autonomously if approached with the back face 12 of the slider 11 or 22, for the magnetic grip of the magnet 13 inserted in said face, against a vertical ferromagnetic surface.

So the cup holder 1 for its most comfortable and easy use for the user can be collected in horizontal or vertical storage elements in a fixed way, that is to say, not easy to remove from or reintroduce in the storage element, in such a way as to create a space in the workplace of several people for the storage of the cups used by the people working without occupying the areas surrounding the workplace.

Therefore each user, who uses a described cup holder 1, can use one disposable cup only in his/her work shift, without fearing to lose it, exchange it with other users, spill its content, without fearing it to become a breeding ground for the pollution of the working environment, or that it is involuntarily taken by another user, considering that, generally, disposable cups are always anonymous. So, also the extraction of the cup 2 from the housing guide 4 is prevented thanks to the possibility of locking the edge 3 of the cup by means of the hole 14 or even by means of the hole 18 of the case 15 for locking the single cup 2 in the cup holder.

Moreover, the production of cup holders with housing guides shaped in such a way as to house different kinds of cups 2, both of paper of the disposable type and rigid with at least one slightly conical end part of the upper edge, is much facilitated and simplified by realizing a cup holder subdivided into two parts: a first upper part 19, mainly comprising the upper closing plane 20 of the cup and the slider 22 as described, and a second lower part 23 comprising the housing guide 24 of the specific cup. The complication of realizing the male guides 27 in the upper part 19 and the blind grooves 27 in the lower part 23 is well compensated for by versatility, by the fact of being able to realize one single upper part connect able at assembly to different lower parts, and by the simplification of production tools. In fact, the lower parts 23 are made with a dimensioning of the respective housing guide 24 for the cups for which they are specifically intended. The so made cup holder is, after the assembly of the two parts, completely corresponding in use to the cup holder described in FIGS. 1 to 11.

Finally, with the structure of the dimensioned slider 44 or 46, a cup holder can be made mobile by a storage element both of the horizontal type and of the vertical type even if not specifically provided upon making of the storage element section. The different dimensioning of their slider between a cup holder for horizontal or vertical storage elements allows to make the cup holders usable by work sectors or exclusive use.

The advantages in the use of one or more cup holders 1, according to the invention, can be summarized as follows. The user when using the cup holder no longer has to control at each use the position of housing of the cup, as this is prearranged at the moment of placing the cup holder, individually in the workplace or in a storage element with the locking and impediment to the extraction or even easier to move if the storage element is provided with notches 35 or indentations 41 for housing the slider 11 or 22 of the cup holder.

By the cup holder provided with the dimensioned slider 44 or 46 there is maximum positioning freedom, because the user can use both the storage elements with vertical arrangement and the storage elements with horizontal arrangement also of the type without insertion points with said notches 35 or indentations 41. The action of insertion/extraction is much facilitated.

Furthermore, the making of the cup holder in two parts makes it possible to have a significant saving both in the design and in the realization of the technical production means and also in the management of production itself, making versatile a specific production for each type of cup that may be required to be supported by the cup holder of the present invention.

The use of the cup holder described herein allows, moreover, a saving in the volume of the waste produced because, especially in summer months, the use of disposable cups increases very much due to the need of using a new cup for each additional pouring of drink or water and also to prevent the exchange of one's cup with the cups of other users who work in the same office or in the same working area in the workshop.

Obviously, in order to meet specific and contingent needs, a person skilled in the art may make several changes to the use of cup holders for single cups, as above described, which are all included in the scope of protection of the present invention as defined by the following claims. Obviously, although less conveniently, a cup holder 1 can also have only one of the above-mentioned modes of support with short shank 10 and slider, or, with magnet 13; and said grip modes on storage elements or shaped sections, as described, can be made in an alternative way with respect to the use of notches, indentations or folded edges of the sections, to hold said sliders of the cup holders inserted in them. Furthermore, the second lower part 23 can be without the lower part of tang 26, using other means to make the connection stable after assembly. Moreover, the rigid connection between the two parts 19 and 23, constituting a cup holder, can occur with connection means different from the sliding and locking means comprising male guides 27, blind grooves 29 and end projections 30, though always realizing the necessary long-lasting stable connection. Finally, all the types of sliders described 11, 22, 44 or 46 can be provided with a bevel or radius 45 to facilitate the operation of insertion A and of rotation R in the desired positioning of the corresponding cup holder 1.

The invention claimed is:

1. A cup holder for single cups, comprising:
   housing means of the cup in the cup holder with grip on the edge or in proximity to the upper edge of the cup and supporting means of the cup holder for supporting the so housed cup;
   a plane upper surface of covering of the cup, when it is housed in the cup holder with such an extension as to entirely cover the cup and rigidly connected to the housing means of the cup;
   wherein the cup holder has the supporting means placed on the side opposite the side of introduction of the cup in the housing means;

the housing means comprises a housing guide for the grip on an upper edge of a cup that is inserted in it by sliding horizontally only parallel to the plane; and the supporting means comprises a short shank, with a direction parallel to the plane and the horizontal housing guide, and a slider, made in direction at 90° to the shank and plane direction, inserted in rectilinear or arched storage elements, placed in a horizontal or even vertical direction.

2. A cup holder for single cups, according to claim 1, wherein the supporting means comprises a magnet inserted in said slider for a magnetic fixing of the cup holder to a ferromagnetic surface.

3. A cup holder for single cups, according to claim 1, wherein the cup holder is made in two parts; a first upper part comprises the plane of covering of the cup, an upper rib, as well as the slider and the short shank of connection of the latter; and a second lower part which comprises the housing guide of the upper edge of the cup, when housed in it; the two parts at assembly are rigidly connected together.

4. A cup holder for single cups, according to claim 3, wherein the rigid connection between the two parts is made by means of sliding means lockable by external action or internal shape.

5. A cup holder for single cups, according to claim 4, wherein the sliding and locking means comprises male guides, blind grooves and end projections.

6. A cup holder for single cups, comprising:
housing means of the cup in the cup holder with grip on the edge or in proximity to the upper edge of the cup and supporting means of the cup holder for supporting the so housed cup;
a plane upper surface of covering of the cup, when it is housed in the cup holder with such an extension as to entirely cover the cup and rigidly connected to the housing means of the cup;
wherein the cup holder has the supporting means placed on the side opposite the side of introduction of the cup in the housing means;
the housing means comprises a housing guide for the grip on an upper edge of a cup that is inserted in it; and
the supporting means comprises a short shank and a slider inserted in rectilinear or arched storage elements, placed in a horizontal or even vertical direction,
wherein the supporting means comprises a magnet inserted in said slider for a magnetic fixing of the cup holder to a ferromagnetic surface, and
wherein the plane or upper surface of covering has locking means of the extraction of the inserted cup, comprising closing elements of the housing means of the cup.

7. A cup holder for single cups, according to claim 6, wherein said closing means comprises a case, provided with an arched lower edge to complete the housing guide of the cup, when inserted in the cup holder.

8. A cup holder for single cups, according to claim 7, wherein more than one cup holder are housed in rectilinear or arched storage elements, placed in a horizontal or even vertical direction with the insertion of the slider within the folded edges of the sections constituting said storage elements; and wherein the storage elements are made with "C"-shaped or "U"-shaped sections, for the insertion and the grip of the supporting means of each cup holder.

9. A cup holder for single cups, according to claim 8, wherein the storage elements have housing or preferred insertion seats of the slider of each cup holder.

10. A cup holder for single cups, according to claim 9, wherein the housing seats include a notch present on a side of a "U"-shaped section.

11. A cup holder for single cups, comprising:
housing means of the cup in the cup holder with grip on the edge or in proximity to the upper edge of the cup and supporting means of the cup holder for supporting the so housed cup;
a plane upper surface of covering of the cup, when it is housed in the cup holder with such an extension as to entirely cover the cup and rigidly connected to the housing means of the cup;
wherein the cup holder has the supporting means placed on the side opposite the side of introduction of the cup in the housing means;
the housing means comprises a housing guide for the grip on an upper edge of a cup that is inserted in it; and
the supporting means comprises a short shank and a slider inserted in rectilinear or arched storage elements, placed in a horizontal or even vertical direction, and
wherein in "C"-shaped sections with folded edges there are insertion points of a respective slider comprising an indentation dimensioned to house the slider in the insertion/extraction; the cup holder after insertion is moved to a position of convenient use in the section itself.

12. A cup holder for single cups, according to claim 11, wherein the storage elements have housing or preferred insertion seats of the slider of each cup holder.

13. A cup holder for single cups, according to claim 12, wherein the housing seats include a notch present on a side of "U" shaped section.

14. A cup holder for single cups, according to claim 12, wherein in "C"-shaped sections with folded edges there are insertion points of a respective slider comprising an indentation dimensioned to house the slider in the insertion/extraction; the cup holder after insertion is moved to a position of convenient use in the section itself.

15. A cup holder for single cups, according to claim 14, wherein a dimension of the indentation in a direction parallel to the section is slightly greater than the corresponding dimension of the slider or even than the dimension measured parallel to the plane of the cup holder, of a horizontally dimensioned slider or the dimension measured perpendicularly to the plane of the cup holder of a vertically dimensioned slider.

16. A cup holder for single cups, according to claim 14, wherein a slider has a dimension measured perpendicularly to the plane of the cup holder, of a horizontally dimensioned slider, or the dimension measured parallel to the plane of the cup holder of a vertically dimensioned slider and wherein it is smaller than the distance between the folded edges of a section with vertical or horizontal arrangement; and furthermore the internal height of said section is greater than the dimension of the slider, measured perpendicularly to the plane of the cup holder, of a horizontally dimensioned slider, or the dimension measured parallel to the plane of the cup holder of a vertically dimensioned slider.

17. A cup holder for single cups, according to claim 1, wherein the slider has bevels or radius between its side faces to facilitate a rotation with respect to an internal height of a section after the insertion within a section of storage.

* * * * *